Aug. 1, 1967    B. R. NAWROCKI    3,334,218
PORTABLE LIGHT SOURCE
Filed Sept. 21, 1966    2 Sheets-Sheet 1
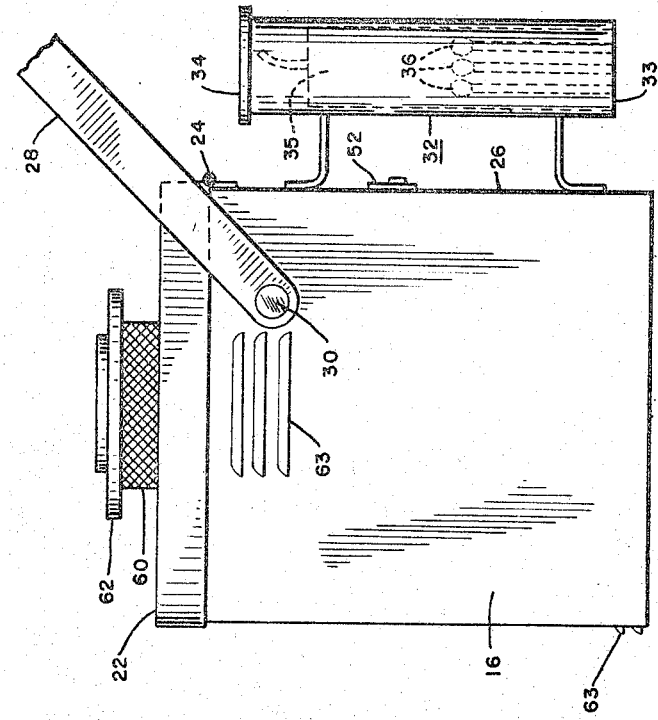
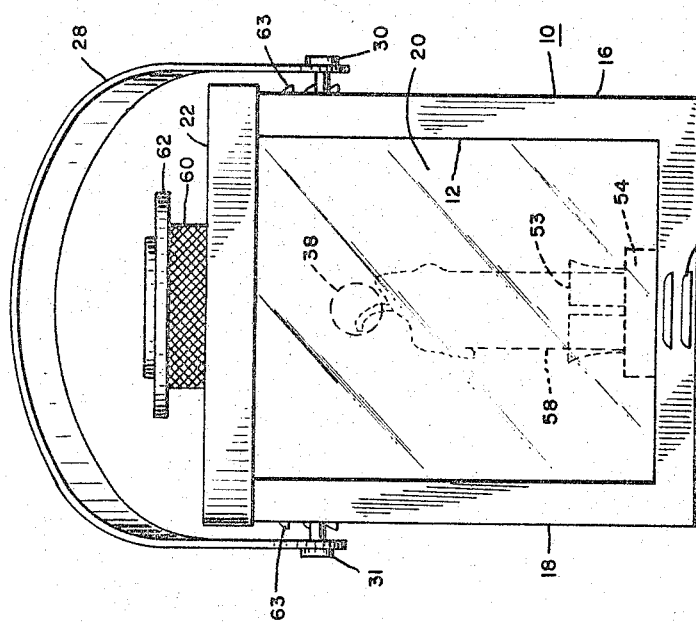
BRONISLAUS R. NAWROCKI
        INVENTOR.
BY Charles C. Knuggle
            ATTORNEY

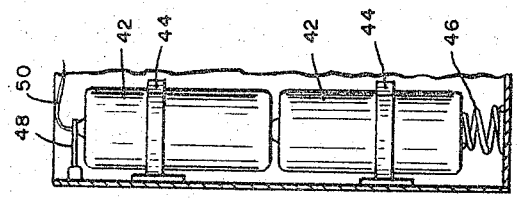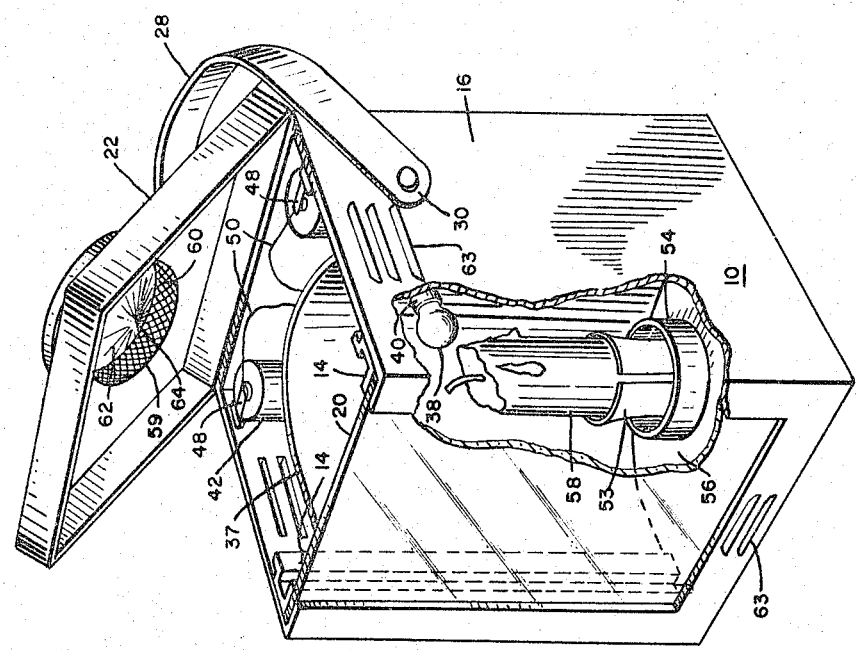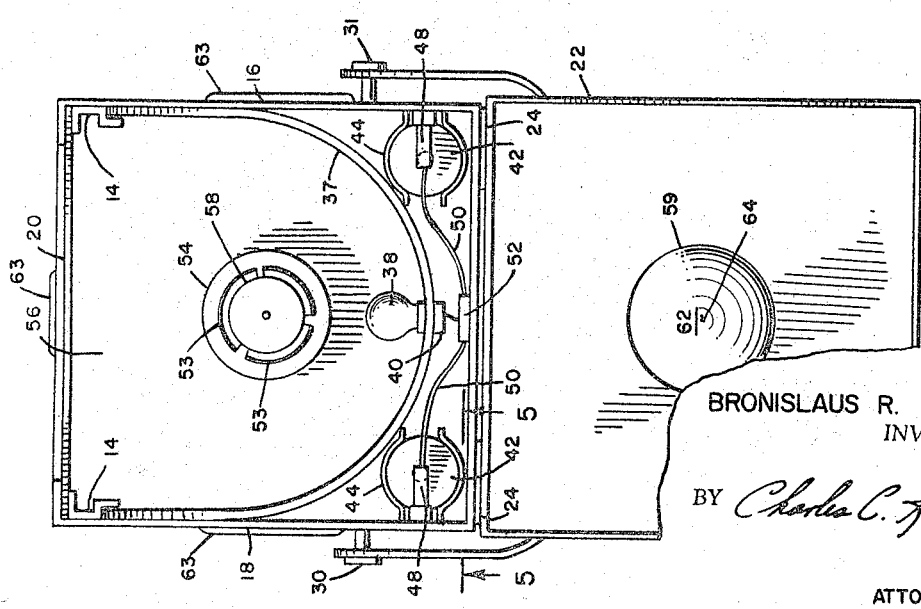

United States Patent Office 3,334,218
Patented Aug. 1, 1967

3,334,218
PORTABLE LIGHT SOURCE
Bronislaus R. Nawrocki, 1527 Fillmore Ave.,
Buffalo, N.Y. 14211
Filed Sept. 21, 1966, Ser. No. 580,924
9 Claims. (Cl. 240—10.63)

ABSTRACT OF THE DISCLOSURE

A portable hand carried search light including an electric bulb and/or a candle as the sources of light. The searchlight includes batteries and a switch for energizing the bulb, plus means for receiving a candle and providing sufficient ventilation for the candle.

Portable lighting equipment generally include an incandescent light bulb powered by dry cell type batteries. This combination has the advantage of efficiently producing a relatively intense source of light with a small amount of heat dissipation. Unfortunately, the filament in the light bulb is fragile and is subject to break when suddenly jammed. Furthermore, the dry cell type batteries have a limited storage life with a tendency to decompose after an extended period of time. If such portable lighting devices are to be employed as stand-by emergency lights, they must be periodically checked for operability.

A particular problem is present when using such lighting devices in the armed forces. The members of the armed forces are generally required to travel rapidly over rough terrain in military carriers, such as jeeps, tank, trucks, etc., subjecting any light bulbs to excessive vibration. In addition, the devices are often exposed to extremely adverse environments, such as hot and humid climates, salt water, etc., causing severe corrosion problems. Any failure effectively renders the device useless, particularly so when replacement parts are not readily accessible.

It is therefore an object of this invention to provide a new and improved portable light including a battery powered light bulb and a secondary source of radiation.

It is still a further object of this invention to provide a new and improved emergency light source that functions after extended storage periods.

A light source including the invention includes a container formed with a window and reflectance means mounted within the container facing the window. An electric light bulb is mounted between the window and the reflectance means and is adapted to be energized by a battery within the container through a switch. Means are included between the window and the reflectance means for receiving a flame generating device, such as a candle, that functions as a second source of light. The container is provided with means for providing sufficient ventilation for the operation of the flame generating means.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIGURE 1 is a front view of a light source including the invention.

FIGURE 2 is a side view of the light source of FIGURE 1.

FIGURE 3 is a top view of the light source of FIGURE 1 with the top opened.

FIGURE 4 is a perspective view of the light source of FIGURE 1 with the top partially opened and a portion of the enclosure cut away.

FIGURE 5 is a cross sectional view of FIGURE 3 taken along the line 5—5.

Referring to the figures, the light source includes a rectangular shaped container 10 having an opening 12 formed in one side. A pair of brackets 14 (FIGURES 3 and 4) are mounted to the inner portions of the containers sides 16 and 18 and form a guide adapted to receive a transparent glass or plastic shield 20. A top 22 is mounted by the hinges 24 to the container rear side 26 and is adapted to be opened as illustrated in FIGURES 3 and 4. A handle 28 is pivotly mounted to sides 16 and 18 through the pins 30 and 31 and provide a means for carrying the light. A second handle 32 is mounted on the rear side 26 and comprises a hollow tubular structure including a sealed bottom portion 33 and a removable top or cap 34. The handle 32 is of sufficient size to include a candle 35 and matches 36 therein. Sufficient insulation is contained within the handle 32 to keep the candle 35 from melting due to handling.

A U-shaped reflector 37 is mounted within the container 10 and is held in place by the brackets 14. A light bulb 38 is suitably mounted in a socket 40 to the reflector 37. Two pairs of batteries 42 are mounted in the space between reflector 37 and the container 10 as illustrated in FIGURE 5. A clip 44 coupled to the container 10 holds the batteries 42 in place. A pair of batteries are connected in series with one end of the pair of batteries connected through a spring 46 to the container 10 and the other end connected to an insulated spring contact 48. The insulated spring contacts are conventionally connected through the wires 50 to a switch 52 mounted in the rear side 26. The switch 52 is connected to the socket 40 for energizing the light 38. The socket 40 is connected to the metallic reflector 36 completing the circuit.

A suitable circular well 5b is mounted on the bottom portion 56 of the container that includes the spring clips 53 adapted to receive a candle 58. The top 22 is formed with a hole 59 with a cylindrical metal screen grating 60 extending outward therefrom. A cap 62 is mounted on the grating 60 with a metal cone 64 extending therefrom toward the candle. The metal cone 64 deflects the heat from the candle 58 through the grating 60. The candle 58 is mounted in place by opening the top 22 and removing the shield 20 by sliding it upwards providing access to the inner portion of the container 10. Openings or vents 63 are formed in the sides 16 and 18 above the U shaped reflector 37 and below the transparent shield 20 to provide a ventilation path through the vents 63 and the grating 60.

The light source can be operated as a battery energized light, or as a candle lantern. Although the light source is illustrated with a candle as the secondary light source, it is to be understood, however, that other types of flame generating devices such as oil or kerosene wick can be used.

I claim:

1. A portable hand carried searchlight comprising:
container means formed with a window;
reflectance means mounted within said container means for directing a beam of light through said window;
means for receiving a light bulb between said reflectance means and said window;
means for mounting at least one battery within said container means;
switch means mounted on said container means and coupled between said battery and said light bulb for controlling the energization thereof;
means for receiving a candle between said reflectance means and said window, and
ventilation means included in said container means for providing an operable atmosphere for said candle.

2. A source of light as defined in claim 1 including a handle coupled to said container adapted to receive and store a candle.

3. A source of light as defined in claim 1 wherein said container means includes a panel that can be opened, and said window comprises a removable transparent panel.

4. A source of light as defined in claim 1 wherein:
said container means is formed in a substantially rectangular shape, and
said reflectance means comprises a removable curved reflectance surface mounted within said container to reflect a light source mounted within said curved reflective surface through said window.

5. A source of light as defined in claim 1 wherein:
said container means include a cover that can be opened;
said reflectance means comprises a removable U shaped reflective surface mounted with said container to reflect a light source mounted within said U shaped reflected surface through said window,
said reflectance means being removable when said cover is opened, and
means for receiving a plurality of batteries between said reflectance means and said container.

6. A source of light as defined in claim 5 wherein:
said means for receiving said flame generating means comprises a candle well mounted to said container within said U shaped reflective surface, and including a handle coupled to said container means having a hollow inner portion for receiving and storing a candle.

7. A source of light as defined in claim 6 wherein:
said means for receiving said light bulb comprises a socket mounted on said reflectance means, and
said switch means is mounted on said container with its handle extending without said container means.

8. A source of light as defined in claim 7 wherein said cover includes ventilation means for said flame generating means.

9. A source of light as defined in claim 8 wherein said window comprises a removable transparent panel whereby a candle is adapted to be positioned in said well by opening said cover and removing said transparent panel.

References Cited

UNITED STATES PATENTS

| | | | |
|---|---|---|---|
| 530,626 | 12/1894 | Rowland | 240—37 |
| 937,125 | 10/1909 | Wells | 240—13 |
| 981,046 | 1/1911 | Welles | 240—37 |
| 3,217,153 | 11/1965 | Ryan | 240—13 |

NORTON ANSHER, *Primary Examiner.*

W. M. FRYE, *Assistant Examiner.*